Patented Nov. 11, 1952

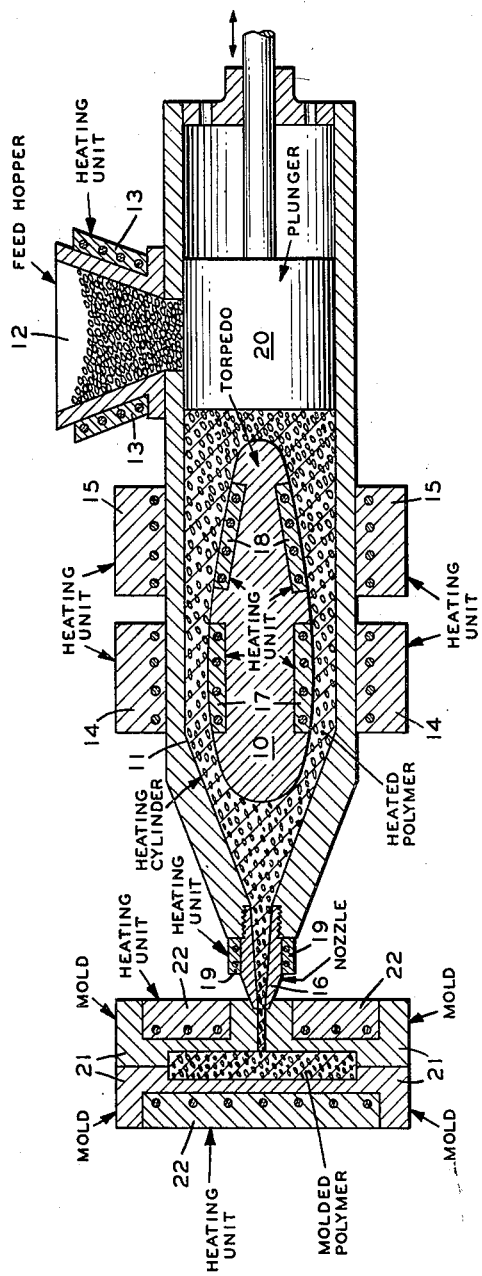

2,617,151

UNITED STATES PATENT OFFICE 2,617,151

INJECTION MOLDING OF POLYTRIFLUORO-CHLOROETHYLENE

Louis C. Rubin, West Caldwell, N. J., assignor to The M. W. Kellogg Company, Jersey City, N. J., a corporation of Delaware Application December 31, 1949, Serial No 136,403

11 Claims. (Cl. 18—55)

This invention relates to the shaping of polytrifluorochloroethylene plastics by injection molding.

The trifluorochloroethylene polymers are a recently developed series of plastics which are prepared by the polymerization of monomeric trifluorochloroethylene under certain conditions. The monomer is formed by refluxing 1,1,2-trifluorotrichloroethane in the presence of a solvent, such as methanol, and zinc dust which dechlorinates the raw material. Trifluorochloroethylene is then separated from the reaction products in substantially pure form by a fractional distillation in which it is recovered as the low boiling fraction. The monomer is mixed with a solution of bis-trichloroacetyl peroxide in a small quantity of trichlorofluoromethane as a polymerization catalyst or promoter, and the polymerization reaction is carried out in a closed vessel under its own vapor pressure at temperatures ranging from $-20°$ C. to $25°$ C. over a period of about seven days. Less time is required for the reaction when the temperature is maintained in the upper portion of the stated range. Lower temperatures tend to form higher polymers, while higher temperatures within the specified range result in the formation of lower polymers. The degree of polymerization can be adjusted by varying the reaction temperature and also by varying the length of the reaction period. Recovery of the normally solid polymers is simple since both unreacted monomer and trichlorofluoromethane may be removed by evaporation at room temperature. Normally liquid polymers for use in plasticizing the normally solid polymers may be prepared in the manner described by W. T. Miller, Jr. et al. in Industrial and Engineering Chemistry, vol. 39, pp. 333–337, March, 1947.

The polymers of trifluorochloroethylene are exceptionally stable and range from liquids through waxy materials to hard solids as the molecular weight increases. For thermoplastics, the solids possess unusually high temperature characteristics which prevented successful injection molding of the material prior to my invention. The solids can be made either transparent, translucent or opaque, at will, and may be blended with solid fillers and coloring agents as desired. In addition to excellent dielectric properties, these materials are impervious to water and not even a trace of water vapor can penetrate polytrifluorochloroethylene films of 0.003 inch or greater thickness. Solid polymers of the type disclosed herein have been tested at temperatures ranging from $390°$ F. down to $-320°$ F. and found to retain their flexibility and other desirable properties throughout this range, which is an unusually broad one for thermoplastic material.

Although polytrifluorochloroethylene solids are insoluble in most of the common solvents and plasticizers, they may be plasticized with certain substances. The best plasticizers are lower polymers of the same material having molecular weights of the order of 950. These are oily liquids which do not change the chemical properties of the plastic in any way; however, the physical properties, especially temperature characteristics, are greatly affected by the incorporation of plasticizers in the solid polymers. Other suitable plasticizers include completely fluorinated mineral oils. Hot milling the plasticizer and polymer together is the preferred method of introducing the plasticizer. The plasticized material is soft, more flexible and more rubbery than the pure solid polymer in proportion to the plasticizer content. In general, the plasticized product may contain up to 30 per cent plasticizer for most purposes, although it may be desirable to use 50 per cent or more of the plasticizer in some articles.

An object of the invention is to provide a method for injection molding trifluorochloroethylene polymers.

A second object of the invention is to provide suitable conditions for the injection molding of plasticized or unplasticized polytrifluorochloroethylene into smooth articles.

A third object of the invention is to provide conditions for the injection molding of polytrifluorochloroethylene plastics of selected properties.

Other objects of the invention will in part be obvious and will in part appear hereinafter.

This invention is concerned with a process for injection molding a thermoplastic containing a trifluorochloroethylene polymer having a no-strength-temperature between about 420 and about $660°$ F., which comprises first heating the plastic between its conversion point and about $550°$ F., and then injecting the heated material through a nozzle maintained at a temperature between the conversion point and about $700°$ F. into a die maintained at a temperature more than about $25°$ F. below said conversion point.

The invention accordingly comprises the several steps and the relation of one or more of such steps with respect to each of the others thereof, which will be exemplified in the process hereinafter disclosed, and the scope of the invention will be indicated in the claims.

The herein described injection molding process applies to plastics containing all or a substantial quantity of polytrifluorochloroethylene with no-strength-temperatures in the range indicated.

The conversion or transition point is the temperature at which an opaque or powdered sample of the material becomes transparent as it is being heated. This temperature is substantially constant at 415 degrees plus and minus about 5 degrees Fahrenheit for normally solid polymers having no-strength-temperatures in the 420–660° F. range and is usually determined by heating the sample under pressure between the platens of a press. Thus with such polymers, the no-strength-temperature may vary but the conversion temperature remains the same. When a solid polymer is plasticized both the no-strength-temperature and the conversion point are lowered, as this is one case where the conversion temperature is changed.

Inasmuch as the determination of the molecular weights of the higher polymers of trifluorochloroethylene is impractical under normal circumstances, a simple no-strength-temperature (N. S. T.) test was devised to provide a measure of the relationship between the various polymers which is based on the temperature characteristics of the materials—a matter of far greater importance than molecular weights in regard to the shaping, heat treating and thermal degradation characteristics of these particular polymers. Although the higher polymers have higher N. S. T. values, it is to be understood that the N. S. T.-molecular weight relationship is not a simple direct one. The test consists of determining the temperature at which essentially all strength properties of the particular polymer are lost. Uniform sample sizes and weight strains are used in all tests. The apparatus in which the tests are conducted comprises a 3″ diameter brass block 5″ long having a ¾″ diameter concentric bore and a thermometer well communicating with the bore. The block is heated by a single winding of asbestos-covered nickel-chrome heating wire which extends the complete length of the block. The block is covered on all sides by a 1″ thick layer of asbestos insulation containing suitable openings for the heating leads and the insertion of a thermometer as well as a ¼″ diameter hole at the bottom. A glass graduate or test tube is placed below this hole with the mouth of the graduate in contact with the asbestos insulation. In determining the no-strength-temperature of a particular specimen a 2″ x ⅛″ x 1/16″ strip is cut from a 1/16″ sheet and symmetrically center-notched with a sharp punch to provide a 1/16″ x 3/64″ minimum cross-section at the notched portion. A small weight is suspended approximately 4″ below the lower end of the strip by a wire, this weight being selected so that the total weight from the notch down is 0.5 gram, then the upper end of the test strip is fastened securely to a sample holder or vise. Next the test assembly is lowered into the vertically disposed bore of the brass block and adjusted to position the notch of the specimen centrally within and half way down the bore. With the apparatus assembled the weight hangs within the glass cylinder below the insulated assembly. Next a thermometer is inserted in the thermometer well, the heating coil is energized and the temperature of the block is brought up to a suitable starting level, such as 410° F. After the temperature has become constant, it is then raised at a steady rate of 2.7° F. per minute until the no-strength-temperature is reached where the sample pulls apart at the notch and drops to the bottom of the glass cylinder. This simple test affords results which can be checked within about 4 to 6° F. as it is not highly sensitive to small variations in the thickness of the test strip. However, care should be exercised to cut a sharp clean notch in each side of the specimen. Differences of 10° F. in the no-strength-temperature indicated by the thermometer are normally considered significant.

When heated to excessive temperatures, trifluorochloroethylene polymers undergo thermal degradation or decomposition in which the individual molecules are cracked or depolymerized to lower polymers. This process appears to commence at approximately 518° F. but the rate of decomposition is extremely slow until the temperature has risen above about 550° F. As the temperature rises further, the decomposition rate continues to increase and the desirable properties of the plastic are lost unless the exposure to the higher temperature is extremely brief. Although the polytrifluorochloroethylene may be heated as high as 800° F. for a few seconds without substantial degradation, provided it is then rapidly cooled below 550° F., it is undesirable to maintain polymers with 420 to 660° F. N. S. T.'s above 550° F. for periods greater than a few minutes. While lower polymers decompose faster than higher polymers at any given temperature above about 518° F., the above remarks are generally applicable to the range of polymers mentioned.

The polymers of trifluorochloroethylene are amenable to heat treatment at temperatures ranging from their conversion points down about 115 degrees lower, that is, from 300 to 415° F. for solid polymers having N. S. T.'s of 420 to 660° F. Maintaining the material within this temperature range for a sufficient period increases its hardness, brittleness, opacity and crystallinity. The treatment proceeds quite slowly in the lower half of the stated temperature range, hence only the upper portion of the range from the conversion point down about 60 degrees therefrom is of primary importance. Of this, the first 25° F. below the transition temperature is the most critical range and advantage is taken of this to select the characteristics of the molded article by rapidly cooling or quenching the article through this range to maximize its flexibility, toughness and transparency. A quenched article may be heat treated later by reheating it within the stated temperature range to promote hardness and opacity. For best control of the hardening at reasonable heat treating rates (usually less than 24 hours) it is preferred to reheat to temperatures of about 20 to 40 degrees below the conversion point. In comparison with a slowly cooled or heat treated article, a quenched article has the appearance of a plasticized product without sacrifice of chemical inertness. Almost perfectly transparent articles up to ⅛ inch in thickness may be produced by quenching, but those of increasing thickness become more and more translucent, due to the insulating qualities of the plastic and the resulting slower cooling of the inner portions. Polymers of low N. S. T. values may be heat treated at lower temperatures than the higher polymers, and the rate of hardening of lower polymers is faster at any given temperature. Enhanced dimensional stability of trifluorochloroethylene plastics can be procured by annealing articles at about 255° F. for 24 hours.

In the injection molding of either plasticized or unplasticized polytrifluorochloroethylene, according to the present invention, conventional apparatus is employed, but the operation is carried out under novel temperature conditions; the accompanying drawing, which is an elevational view partly in cross-section, shows a good example of one of these machines in which a torpedo or separator 10 is concentrically located in the heating cylinder 11 in order to bring the molding material into closer contact with the heated cylinder wall. Modification or revision of the heating and heat control or indicating devices may be necessary to provide and control the higher temperatures required as well as to apply heat at additional points. In view of the relatively high temperatures employed, it is recommended that all parts of the machine, which come in contact with the molding material, should be either chromium plated or of stainless steel construction to avoid contamination of the molded articles by corrosion products. Caution should be exercised against handling of the molding material and the presence of foreign matter in the machine, as the organic matter in perspiration and other substances will tend to decompose at the injection cylinder temperatures and darken the product. Typical injection molding pressures of from 5,000 to 20,000 pounds per square inch are suitable for use in the present process.

Preheating of the polytrifluorochloroethylene is an optional but desirable step and temperatures ranging from about 200 to about 300° F. are recommended for the purpose. This may be performed either in an oven or in the feed hopper 12 by providing the latter with any suitable heating device, such as heating unit 13.

In the heating cylinder or chamber 11 the material is heated to a temperature between its conversion point and about 550° F. and it is preferable to hold the maximum temperature below 550° F. This may be accomplished in a heating chamber provided with a single heating element but it is more desirable to have two or more heating means, such as heating units 14 and 15, in order that the temperature increase in the cylinder will be more gradual and the material will not be held at its maximum temperature any longer than necessary; however, the plastic must have been heated to its transition temperature by the time it reaches the nozzle 16. With the two heating elements 14 and 15, it is preferred to maintain the rear half or entrance section of the heating cylinder between about 300 and 450° F., while the exit section or front half of the chamber is kept at a temperature between the conversion point of the molding material and about 550° F. It is also desirable to provide one or more heating elements, such as 17 and 18, for the torpedo 10 in order that the molding material may be more uniformly heated. Where the heat is transferred to the molding material through the wall of the heating cylinder 11 and optionally the heated torpedo 10, the temperature of the molding material will closely approximate that of the cylinder walls. The situation is different at the nozzle 16 for the material is exposed to the heat of the nozzle for a considerably shorter interval; therefore, there is a much greater difference between the nozzle temperature and the average temperature of the material passing therethrough. Because of this, the nozzle 16 may be heated to a considerably higher temperature than the injection cylinder 11 without substantial decomposition of the plastic flowing therethrough and this is a desirable feature to expedite the flow of the plastic at this point. The nozzle 16 may be maintained at a temperature between the conversion point of the plastic and about 700° F., and the best results will be obtained when the temperature is between about 20 degrees below and about 80 degrees above the N. S. T. of the material but not less than about 50 degrees above its conversion point. Although the nozzle 16 may receive all of its heat from the exit end of the heating cylinder 11, it is recommended that the nozzle 16 be equipped with a separate heating element 19 in order to maintain an independently controlled higher or lower temperature. Where an extremely long molding cycle is being used or there are frequent halts in operation, any overheated material in the nozzle 16 can be readily removed therefrom with a short stroke of the plunger 20 while the mold 21 is open. Providing a relatively large number of thermocouples in various locations throughout the machine is an excellent precaution against local overheating of the plastic.

The softened material may be injected into the cold mold or die 21 as is customary in molding thermoplastics by injection. However, in contrast to the usual procedure, it is preferred to heat this die 21 with heating units 22, in order to promote the flow of the plastic throughout its contours and also to avoid any possibility of skin cracking. Accordingly it is preferred to maintain the die 21 at a temperature between about 25° F. and about 215° F. below the conversion temperature of the plastic, and the best range here is between about 90° F. and about 165° F. below the conversion point, in order to quench or rapidly cool the molding article to enhance its flexibility, toughness and transparency. Other advantages accruing from heating the mold 21 are that it permits a reduction in cylinder temperature without increasing the piece "set-up" time appreciably and improves the surface appearance of the resulting article. With a cold mold the cylinder and nozzle temperatures should, within the ranges indicated above, be increased about 20° F. since the figures set forth refer to molding in heated dies.

To mold any given sample of polytrifluorochloroethylene powder or granules, the N. S. T. should be determined and the heating elements adjusted to the minimum temperatures in the preferred ranges above with the mold heated to about 300° F. Next, the cylinder is filled with the molding material which is allowed to remain there until it slowly oozes out of the nozzle. Then, starting with the shortest feasible cycle, pressure and then cycle are increased until a full "shot" is obtained. If a complete casting is not achieved, the cylinder and nozzle temperatures are raised in 20° F. increments, keeping the cycle constant, until a full "shot" or casting results. The production rate can then be increased by elevating the temperatures within the stated ranges while reducing the overall cycle. Typical molding cycles run from 30 to 120 seconds. The general rule to follow is to keep the temperatures of the heating chamber and nozzle as low as is consistent with a satisfactory production rate. The importance of proper temperature control should not be underestimated, especially when working at temperatures in the region where thermal degradation may be anticipated.

Since certain changes may be made in carrying out the above method without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention, which as a matter of language might be said to fall therebetween.

Having described my invention, what I claim as new and desire to secure by Letters Patent, is:

I claim:

1. In a process for the injection molding of a thermoplastic material comprising a trifluorochloroethylene polymer having a no-strength-temperature between about 420 and about 660 degrees Fahrenheit, the steps which comprise heating said material to a temperature between its conversion point and about 550 degrees Fahrenheit in an injection chamber and injecting said heated material through a nozzle maintained at a temperature substantially above the average temperature of material in said injection chamber and below about 700 degrees Fahrenheit into a die maintained at a temperature more than about 25 degrees Fahrenheit below the conversion point of said material.

2. The process of claim 1 in which the die is maintained at a temperature between about 25 and about 215 degrees Fahrenheit below the conversion point of said material.

3. The process of claim 1 in which the die is maintained at a temperature between about 90 and about 165 degrees Fahrenheit below the conversion point of said material.

4. In a process for the injection molding of a thermoplastic material comprising a trifluorochloroethylene polymer having a no-strength-temperature between about 420 and about 660 degrees Fahrenheit, the steps which comprise heating said material to a temperature between its conversion point and about 550 degrees Fahrenheit in an injection chamber and injecting said heated material through a nozzle maintained at a Fahrenheit temperature at least about 50 degrees above the average temperature of material in said injection chamber and between about 20 degrees below and about 80 degrees above the no-strength-temperature of said material into a die maintained at a temperature more than about 25 degrees Fahrenheit below the conversion point of said material.

5. In a process for the injection molding of a thermoplastic material comprising a trifluorochloroethylene polymer having a no-strength-temperature between about 420 and about 660 degrees Fahrenheit, the steps which comprise heating said material to a temperature between its conversion point and about 550 degrees Fahrenheit in an injection chamber by conduction from the heated chamber and from a heated torpedo concentrically disposed therein, and injecting said heated material through a nozzle maintained at a Fahrenheit temperature at least about 50 degrees above the average temperature of material in said injection chamber and between about 20 degrees below and about 80 degrees above the no-strength-temperature of said material into a die maintained at a temperature more than about 25 degrees Fahrenheit below the conversion point of said material.

6. In a process for the injection molding of a thermoplastic material comprising a trifluorochloroethylene polymer having a no-strength-temperature between about 420 and about 660 degrees Fahrenheit, the steps which comprise heating said material to a temperature between about 300 and about 450 degrees Fahrenheit in the entrance section of an injection chamber, further heating said heated material to a temperature between its conversion point and about 550 degrees Fahrenheit in the exit section of the injection chamber, and injecting said heated material through a nozzle maintained at a Fahrenheit temperature at least about 50 degrees above the average temperature of material in said injection chamber and between about 20 degrees below and about 80 degrees above the no-strength-temperature of said material into a die maintained at a temperature more than about 25 degrees below the conversion point of said material.

7. In a process for the injection molding a thermoplastic material comprising a trifluorochloroethylene polymer having a no-strength-temperature between about 420 and about 660 degrees Fahrenheit, the steps which comprise preheating said material to a temperature between about 200 and about 300 degrees Fahrenheit, heating said preheated material to a temperature between about 300 and about 450 degrees Fahrenheit in the entrance section of an injection chamber, further heating said heated material in the exit section of the injection chamber to a temperature between its conversion point and about 550 degrees Fahrenheit, and injecting said heated material through a nozzle maintained at a Fahrenheit temperature at least about 50 degrees above the average temperature of material in said injection chamber and between about 20 degrees below and about 80 degrees above the no-strength-temperature of said material into a die maintained at a temperature more than about 25 degrees below the conversion point of said material.

8. An injection molding process which comprises preheating to a temperature between about 200 and about 300 degrees Fahrenheit a thermoplastic trifluorochloroethylene polymer prepared by polymerizing trifluorochloroethylene at a temperature between about −20 and about +25 degrees centigrade to a no-strength-temperature between about 420 and about 660 degrees Fahrenheit, heating said preheated polymer to a temperature between about 300 and about 450 degrees Fahrenheit in the entrance section of an injection chamber, further heating said heated polymer in the exit section of the injection chamber to a temperature between its conversion point and about 550 degrees Fahrenheit, and injecting said heated polymer through a nozzle maintained at a Fahrenheit temperature at least about 50 degrees above the conversion point of said polymer and between about 20 degrees below and about 80 degrees above the no-strength-temperature of said polymer into a die maintained at a temperature between about 25 and about 215 degrees Fahrenheit below the conversion point of said polymer, the nozzle being maintained at a temperature higher than the average temperature of polymer in said chamber.

9. An injection molding process which comprises preheating to a temperature between about 200 and about 300 degrees Fahrenheit a thermoplastic trifluorochloroethylene polymer prepared by polymerizing trifluorochloroethylene at a temperature between about −20 and about +25 degrees centigrade in the presence of trichloroacetyl peroxide to a no-strength-temperature between about 420 and about 660 degrees Fahrenheit, heating said preheated polymer to a temperature between about 200 and about 450 degrees Fahrenheit in the entrance section of an injection chamber, further heating said heated polymer in the exit section of the injection chamber to a temperature between its conversion point and about 550 degrees Fahrenheit, and injecting said heated polymer through a nozzle maintained at a Fahrenheit temperature at least about 50 degrees above the conversion point of said polymer and between about 20 degrees below and about 80 degrees above the no-strength-temperature of said polymer into a die maintained at a temperature between about 90 and about 165 degrees Fahrenheit below the conversion point of said polymer, the nozzle being maintained at a temperature high than the average temperature of polymer in said chamber.

10. In a process for the injection molding of a thermoplastic material comprising a trifluorochloroethylene polymer, the steps which comprise supplying said material to an injection chamber, heating said material above its conversion point, and injecting said heated material through a nozzle maintained at a temperature substantially above the average temperature of material in said injection chamber into a die.

11. In a process for the injection molding of a thermoplastic material comprising a trifluorochloroethylene polymer, the steps which comprise supplying said material to an injection chamber, heating said material above its conversion point, and injecting said heated material through a nozzle maintained at a temperature at least about 50° F. above the average temperature of material in said injection chamber into a die.

LOUIS C. RUBIN.

REFERENCES CITED

The following references are of record in the file of this patent:

UNITED STATES PATENTS

| Number | Name | Date |
| --- | --- | --- |
| 2,309,729 | Gordon | Feb. 2, 1943 |
| 2,325,060 | Ingersoll | July 27, 1943 |
| 2,361,900 | Lowry et al. | Oct. 31, 1944 |

FOREIGN PATENTS

| Number | Country | Date |
| --- | --- | --- |
| 578,168 | Great Britain | June 18, 1946 |

OTHER REFERENCES

"New High Temperature Thermoplastic," Modern Plastics, Oct. 1948, pp. 168, 170, 172.